May 14, 1929.  S. A. STRANAHAN  1,713,242
STEERING GEAR CHECK
Filed March 19, 1926
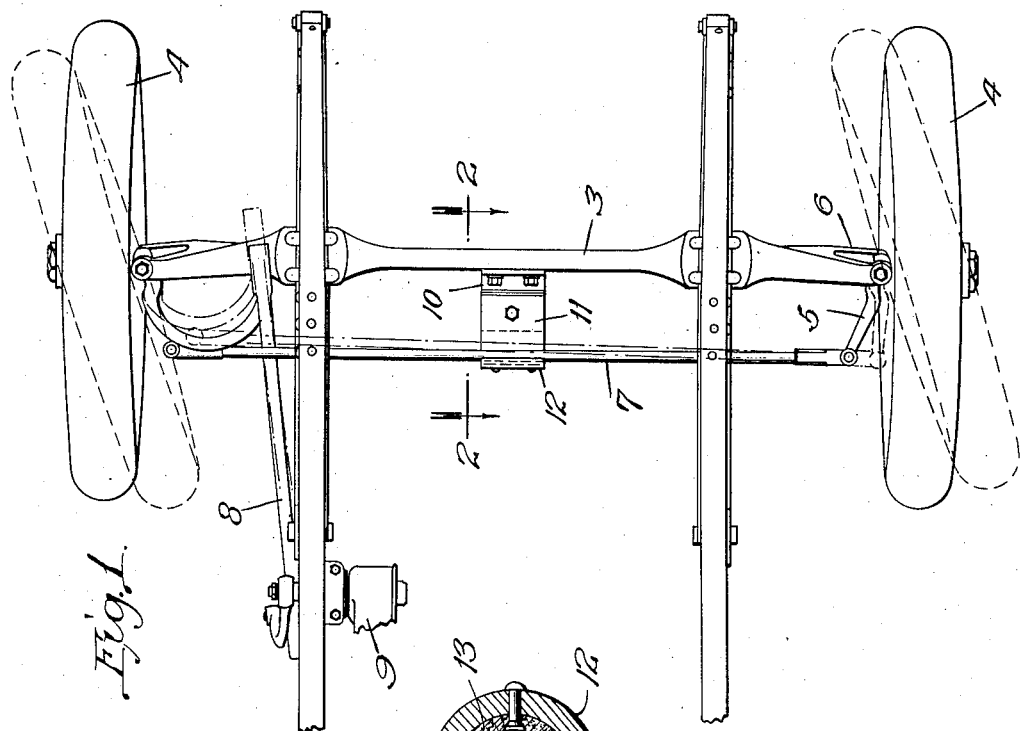
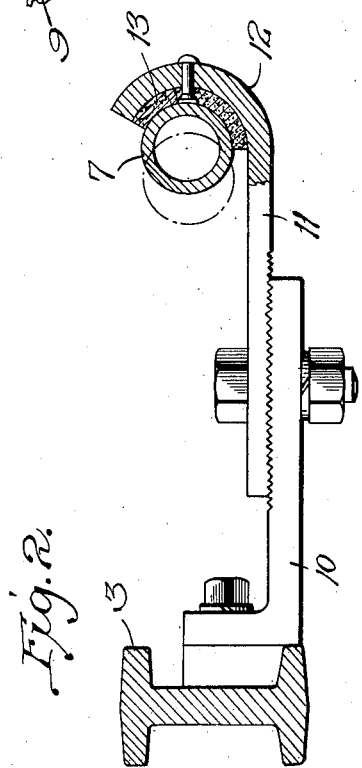
Inventor
Samuel A. Stranahan Patented May 14, 1929.

1,713,242

UNITED STATES PATENT OFFICE.

SAMUEL A. STRANAHAN, OF FLINT, MICHIGAN, ASSIGNOR TO GENERAL MOTORS CORPORATION, OF DETROIT, MICHIGAN, A CORPORATION OF DELAWARE.

STEERING-GEAR CHECK.

Application filed March 19, 1926. Serial No. 95,994.

My invention relates to steering apparatuses for automobile vehicles and more particularly to such devices which automatically function to retain the steering wheel, or wheels in their intended position of adjustment during the running of an automobile, and has for its object the elimination of the undesirable vibratory shaking or swerving of the front wheels, which is not uncommonly present when the steering gear becomes somewhat worn or the structure of the automobile, from overload or otherwise, is improperly balanced.

Another object is to provide a device simple and inexpensive in construction, yet positive and instantaneous in use.

Other objects will appear hereinafter.

In the accompanying drawing:

Figure 1 is a diagrammatical plan view of a front wheel construction illustrating the embodiment of my invention therein, showing in full lines my device functioning with the wheels in the ahead position and in broken lines the device inoperative when the wheels are set in a given steering position.

Figure 2 is a partly sectional view of a device taken at the plane of the line 2—2 on Figure 1 and illustrating the construction and manner of attachment of the said device.

Similar parts throughout the drawing are designated by similar numerals of reference.

In Figure 1 I have illustrated my invention as applied to a steering axle 3, such as is most commonly used in motor vehicles, the steering wheels 4 being mounted on steering knuckles or stub axles having arms 5 extending therefrom, and which knuckles are carried in the bifurcated ends 6 of the said axle 3. The steering arms 5 are joined together by a tie rod or drag link 7 which is actuated by a lever 8 connected to the steering gear 9.

My invention is adapted to be mounted upon any of the usual axle constructions such as indicated in Figure 1 by the numeral 3, and, as will be seen, no change of construction therein is necessitated. At the center of the front axle is mounted a bracket 10 carrying an adjustable clamp 11, which comprises an outer bar adjustably engaging the said bracket 10, preferably as illustrated in Figure 2, and terminating in a curved end portion 12, the said end portion being adapted to receive the rear side of the drag link 7. A piece of brake lining 13 is interposed between the two parts and adjustable clamp 11 is adjusted so that it exerts a slight tension or grip on the drag link 7 when the wheels are disposed in ahead position.

From the foregoing construction, it will be obvious that by having a means to resist the movement of the drag link 7, any external tendency of the wheels to oscillate about the axis of the steering knuckles will be greatly diminished, if not totally checked. The engagement of the curved portion 12 with the said drag link 7, is not of such nature, however, as to render steering difficult by the operator; in fact the device functions to aid the operator in steering in as much as the drag link 7 is maintained in fixed position when the wheels are in ahead position, the friction pressure thus serving not only to obviate the undesirable lateral oscillation and shaking of the wheels with the consequent wear and tear on the tires, but also to facilitate accurate steering by the operator.

From the foregoing it will be seen that I have provided a construction, combination and arrangement of the parts which will fully attain the objects of the invention hereinbefore set out.

Modifications of the above may be made within the spirit and scope of my invention.

What I claim is:

1. A steering gear appliance comprised of an element adapted for attachment to a vehicle axle, an elongated, horizontally disposed member adjustably connected to said element, and carrying a plate which is disposed substantially perpendicularly to the ground and is adapted to contact the tie rod which forms a part of the steering gear.

2. In the structure described in claim 1, a friction facing for the said last named plate.

3. In a steering gear appliance and in combination with a tie rod extending along the front axle, and which rod forms part of the steering gear of a vehicle; an element carried by said axle and extending into the vicinity of said tie rod; and means carried by said element for frictionally engaging said rod when the wheels are in a position for straight ahead movement of the vehicle, and for releasing said rod when the wheels are turned from their position for straight ahead movement of the vehicle.

In testimony whereof I affix my signature.

SAMUEL A. STRANAHAN.